Figure 1:
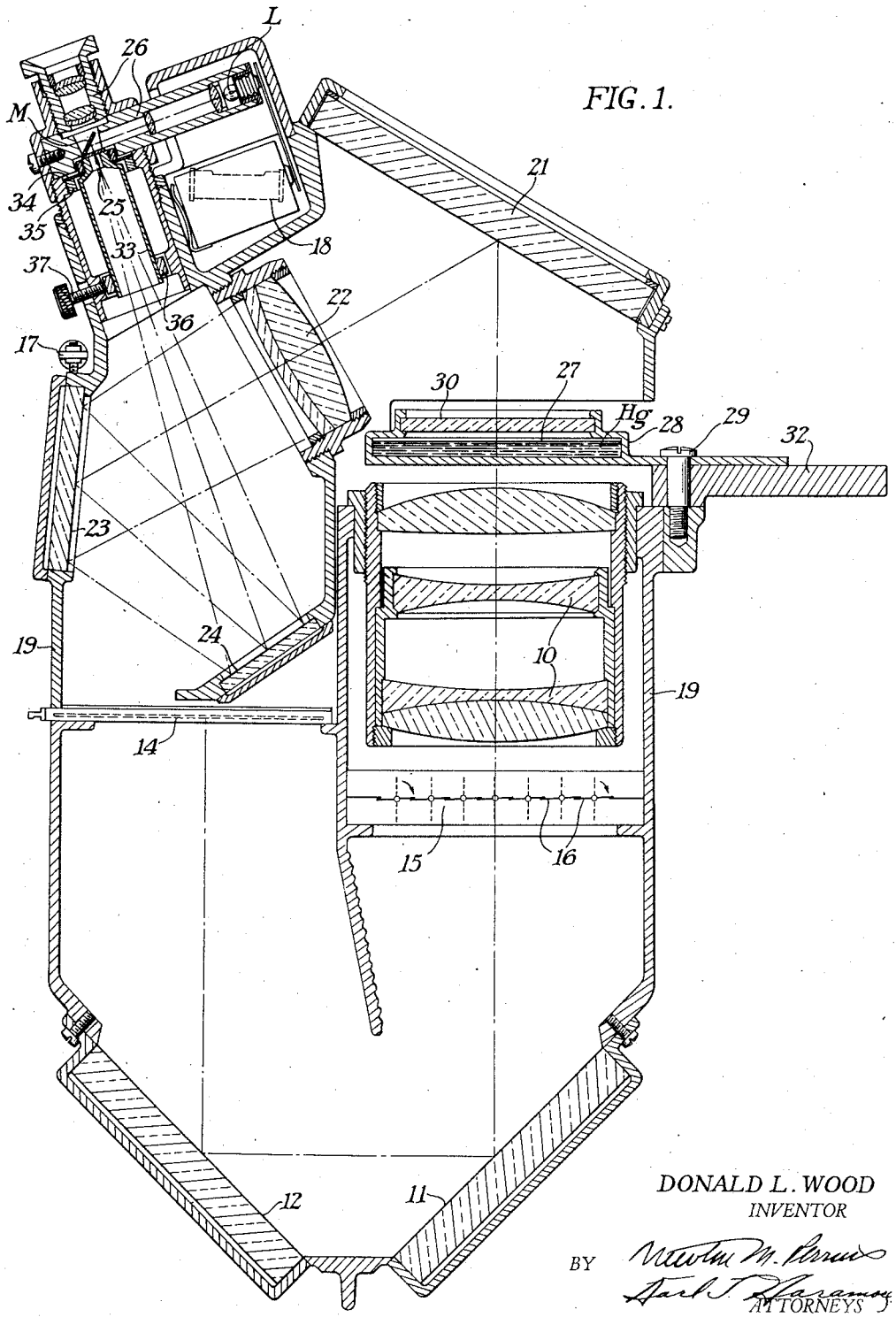

Sept. 11, 1945. D. L. WOOD 2,384,666
ASTRONOMICAL CAMERA
Filed Dec. 10, 1942 2 Sheets-Sheet 2

DONALD L. WOOD
INVENTOR
BY
ATTORNEYS

Patented Sept. 11, 1945

2,384,666

UNITED STATES PATENT OFFICE 2,384,666

ASTRONOMICAL CAMERA

Donald L. Wood, Rochester, N. Y., assignor to Eastman Kodak Company, Rochester, N. Y., a corporation of New Jersey Application December 10, 1942, Serial No. 468,513

7 Claims. (Cl. 95—18)

The present invention relates to photography, and particularly to an astronomical camera which is designed to photograph with a high degree of accuracy a portion of sky surrounding the zenith.

The latitude and longitude of a given position on the surface of the earth can be determined from a photograph of the heavens from that position which will include an indication of the zenith point from said position. By means of subsequent measurement of the star images in relation to the zenith point on the photograph, and from a knowledge of the Greenwich sidereal time of the exposure the longitude and latitude of said position can be computed. It is essential to an accurate determination of the latitude and longitude of a given position, that the zenith point be extremely accurately located with respect to the star field photographed from the position it is desired to locate. Astronomical cameras for this purpose can theoretically be vertically aligned by means of vial levels, and the like, so that the photograph will be taken directly overhead, and in which case the center of the photograph might be assumed to be the true zenith point. Or, the zenith point might be indicated on the photograph by an image of a fiducial mark located in fixed relation to the optical axis of the camera. In either instance, the true zenith depends upon the camera being accurately set up so that its optical axis is truly vertical. Notwithstanding the fact that accurate leveling means, and great care, might be used in setting up such an astronomical camera, it has been found to be impossible from a practical standpoint to set up a camera so that its optical axis is truly vertical, or vertical to a degree acceptable for obtaining the true zenith of the camera position and necessary to the accurate determination of the longitude and latitude of the camera position by the method set forth.

Therefore, one object of the present invention is the provision of an astronomical camera by means of which an indication of the true zenith point in conjunction with the star field surrounding said point can be obtained on a photographic plate.

Another object of the present invention is the provision of an astronomical camera of the type set forth with which a photographic indication of the true zenith will be obtained on the plate regardless of whether or not the camera is adjusted so that its optical axis is truly vertical.

And another object is the provision of an astronomical camera of the type set forth in which the true zenith point is represented by a fiducial mark adapted to be imaged by a secondary optical system on the light-sensitive surface simultaneously with the star field imaged on said surface by the primary optical system of the camera.

And still another object is the provision of means for adjusting the fiducial mark in the secondary optical system so that the image of the same on the light-sensitive surface indicates the true zenith regardless of whether or not the camera is adjusted to have its primary optical axis truly vertical.

And yet another object is to provide a camera of the type set forth which includes means for optically combining the image of the field formed by the primary optical system of the camera with the image of the fiducial mark formed by the secondary optical system so that the two images can be exposed simultaneously onto the light-sensitive surface.

And a further object is the provision of means for adjusting the fiducial mark relative to the secondary optical system, and/or the combined optical systems, until its image represents the true zenith, said means including a level reflecting member movable into and out of the secondary optical system, and/or the combined optical systems, and an eye-piece in the secondary system for illuminating said fiducial mark and viewing the mark and its image.

Figure 4:
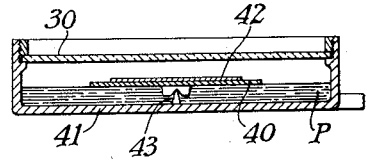

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a vertical sectional view of an astronomical camera constructed in accordance with the preferred embodiment of the present invention, Fig. 2 is a diagrammatic lay-out of the optical system of the camera, Fig. 3 is an illustration of the type of photographic negative made with this camera, with the stars, and zenith greatly exaggerated in size to clearly show them, and Fig. 4 is a second embodiment of a level reflecting member which might be used in place of a pool of mercury as shown in the preferred embodiment.

Like reference characters refer to corresponding parts throughout the drawings.

In general, the astronomical camera according to the present invention comprises a primary optical system for forming the image of a star field on a light-sensitive surface and a secondary optical system including a fiducial mark the image of which is adapted to represent the true zenith on the sensitive surface. Means are provided for adjusting the fiducial mark relative to the optical systems so that it will represent the true zenith, and means are provided for combining images of the two optical systems so that the images of the star field and true zenith will be recorded simultaneously on a light-sensitive surface.

Figure 2:
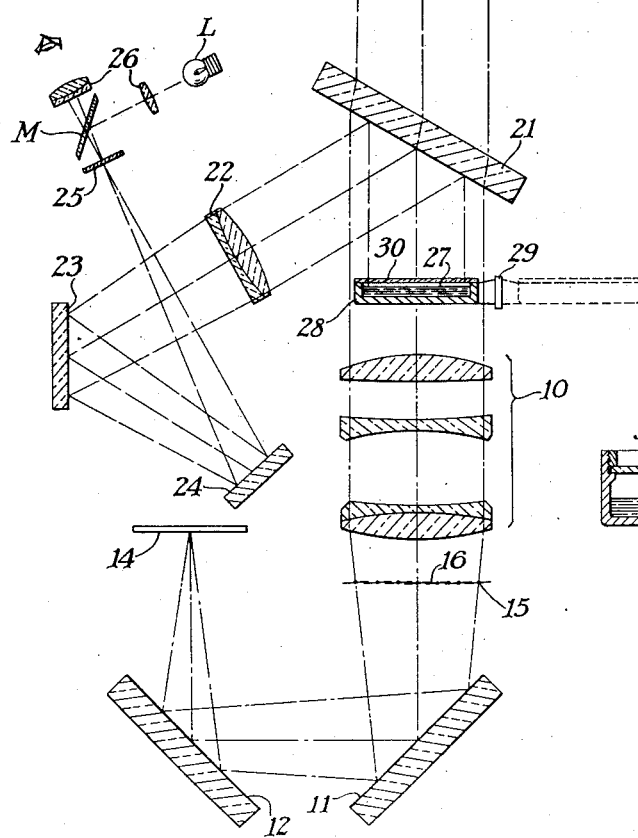
Figure 3:
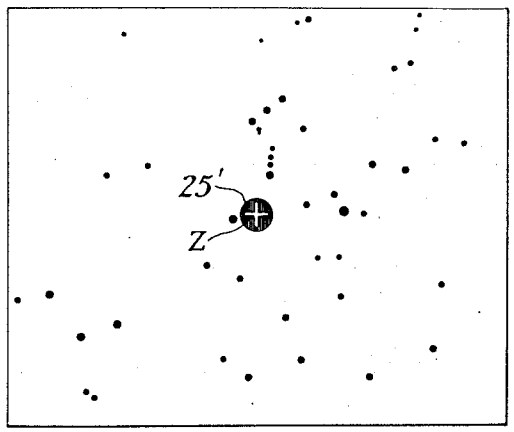

Referring now to the drawings, and particularly to Figures 1 and 2, 10 is a long focus photographic objective of relatively large aperture, and 11 and 12 are first surface mirrors for directing the light entering the objective to a light sensitive surface 14. As shown, the light-sensitive surface is preferably a glass photographic plate, but it is pointed out that any form of light-sensitive surface, such as cut film, roll film, etc., could be used if desired. The mirrors 11 and 12 are used only for bending the optical system into a convenient shape for portability, and could be omitted if portability of the apparatus was of no importance. 15 is a photographic shutter for controlling the exposure of the light-sensitive surface. Although the form and construction of the shutter is no limiting factor of the present invention, for the purposes of illustration I have shown the shutter as comprising a plurality of blades 16 pivoted at spaced points across the field of the objective on axes substantially at right angles to the optical axis of the camera, see Fig. 1. In the open position of the shutter, the individual blades extend substantially parallel to the optical axis, as shown in broken lines in Fig. 1, and to close the shutter these blades are each capable of moving through 90 degrees, in the direction indicated by the arrows, to a position where their adjacent edges overlap.

The parts noted up to this point form an ordinary camera whose optical axis is to be set approximately vertical by means of vial levels 17 and 18 mounted on the exterior of the camera housing 19. The center of the light sensitive surface then represents the zenith, approximately, and to obtain a higher degree of accuracy, an auxiliary optical system is used to print a fiducial mark on the light-sensitive surface 14 as described below. In order to distinguish this auxiliary optical system from the main optical system of the camera, throughout the remainder of the specification and claims the optical system of the camera used to form the image of the field on the light-sensitive surface will be referred to as the primary optical system, while the auxiliary optical system for forming an image of the fiudcial mark on the light-sensitive surface will be referred to as the secondary optical system of the camera.

In accordance with the present invention the auxiliary, or secondary, optical system of the camera comprises a plane-parallel clear-glass plate 21 inclined to and cutting across the axis of the primary optical system of the camera, a collimator objective 22, first-surface mirrors 23 and 24 for bending the system into a convenient shape, a reticle 25 containing a suitable fiducial mark, and a conventional Gauss eye-piece 26 for illuminating and viewing the reticle. 27 is a level reflecting member for establishing a truly horizontal plane reflecting surface and which can be moved into and out of the second optical system, or the combined optical systems.

In the preferred embodiment of the invention shown in Figs. 1 and 2, the level reflecting member 27 is shown as comprising a cup 28 containing a quantity of mercury and which cup is pivoted on a stud 29 at the outside of the camera housing so that the cup can be swung, through a cutout in the housing wall from a position where it is in the optical system, as shown, to a position where it is removed from the optical system. The pool of mercury is swung into the optical system to adjust the position of the fiducial mark to represent the true zenith, and after so adjusting the position of the mark the pool of mercury is swung out of the optical system prior to making an exposure on the light-sensitive surface. In order to prevent the mercury from spilling out of the cup 28 when the camera is tilted, the cup is sealed by a plate of glass 30 having parallel faces.

In operation, the collimator axis, or the axis of the secondary optical system, is set exactly perpendicular to the mercury surface (in the space between the inclined reflecting plate 21 and the mercury pool) by viewing the reflected image of the fiducial mark in the eye-piece and making an appropriate lateral adjustment of the reticle. When the fiducial mark is properly adjusted it will represent the true zenith, and its image printed on the light-sensitive surface will indicate the true zenith as imaged on said surface by the primary optical system. After the fiducial mark is properly adjusted so that it represents the true zenith, the mercury pool is removed from the optical system by means of a counterweighting handle 32 connected thereto, and then the shutter is opened to make a simultaneous exposure of the stars and the fiducial mark (true zenith) as provided by the secondary optical system. The handle 32 counterweights the horizontal reflector so that the center of gravity of the instrument will not shift when the mirror is moved between its two positions. It will be readily understood that the inclined plate 21 forms a means for combining the secondary optical system with the primary optical system so that the images formed by both will be projected simultaneously onto the light-sensitive surface in superimposed relation.

There are any number of ways in which the reticle 25 can be mounted in the apparatus so that it can be adjusted to provide for the necessary lateral adjustment of the fiducial mark. As one way of accomplishing this adjustment, I have shown the reticle 25 mounted in the rear of a tube 33 which is pivoted adjacent its rear end in a diaphragm 34 fixed in the housing 19 by a screw-threaded ring 35. The forward end of the tube carries a bearing ring 36 against which two adjustment screws 37, only one of which is shown, extending through the housing are adapted to rest. While only one adjusting screw 37 is shown in Fig. 1, it is pointed out that the second one will engage the bearing ring at a point 90 degrees from the point engaged by the adjusting screw that is shown so that the reticle can be adjusted in any direction laterally of the optical system of the eye-piece. While strictly speaking, with the disclosed arrangement the reticle and the fiducial mark thereon is adjusted in an arc rather than a straight line relative to the optical system, the adjustments necessary in the reticle are so small that the arcs of movement can be considered as straight lines for all practical purposes in the operation of this instrument.

In Fig. 3 I have shown how a photographic negative made with this camera might look, the sizes of the stars and zenith point being exaggerated as to actual size for the purposes of clear illustration. The image of the fiducial mark which is the true zenith is indicated by the reference character Z and the other dots on the picture will represent stars in the field covered by the lens. It is possible to make a satisfactory exposure with this camera of sufficiently short duration so that the stars will appear as points in the picture rather than as lines because of the relative movement between the stars and the earth.

It is conceivable that the fiducial mark might take any desired shape and form, but for the present purpose I have found that the best results are obtained if the mark consists of opaque cross-hairs on a transparent or translucent reticle. The reticle is preferably transparent because the image of the fiducial mark reflected by the mercury mirror 27 must be viewed therethrough by the eye-piece so that the reticle can be adjusted to bring the reflected image of the mark directly on the mark itself. It will thus be seen, that if the reticle is transparent then a circle of light from the lamp L, and reflected by the semitransparent mirror M of the eye-piece, the size of the reticle will appear on the light-sensitive surface as a dark circle and the fiducial mark will appear on the photographic negative as a white cross within said dark circle as shown in Fig. 3. So that the image of the reticle on the picture will obscure as small a part of the field as possible, it is desirable that the reticle itself be kept small. I have found that an image 25' of the reticle on the picture which is approximately .040 of an inch in diameter is satisfactory. It is to be understood that the photographs are used in their negative form for computation purposes rather than going through the added steps of making a positive print from the negative.

If the camera as a whole is by chance adjusted so that the primary, or photographic, axis is truly vertical the image of the fiducial mark, or the true zenith, will appear exactly in the center of the light-sensitive surface. While this condition is desirable, it is not absolutely necessary because the measurements of the relative positions of the true zenith and stars necessary to a determination of the longitude and latitude can be made whether the true zenith is exactly in the center of the picture or not. There are, however, at least two reasons why the camera itself should be adjusted so that its photographic axis is within one to five minutes of the true vertical. First, the computations involved in reducing the photographic data are simplified under these conditions. The second reason, so far as the present camera is concerned, is so that the reflected image of the fiducial mark will at once fall on the reticle and can be viewed in the eye-piece for adjusting the fiducial mark to the true zenith position. In the present instance, the diameter of the reticle is quite small and if the photographic axis of the camera is too far from the vertical the reflected image of the fiducial mark will not fall on the reticle so that it can be viewed in the eye-piece for purposes of adjusting the fiducial mark to the true zenith position.

The level reflecting surface 27 does not have to be a pool of mercury as has been shown as the preferred embodiment of this part, but may constitute a reflecting surface constructed in accordance with the embodiment shown in Fig. 4. As shown in Fig. 4 the level reflecting surface may comprise a float 40 floated on a suitable liquid P, such as mercury, and carrying a mirror 42. A pin 43 serves to prevent this float and mirror from moving too far from a central position and at the same time permits the mirror to incline relative to the pin to assume the level of the liquid. The angle of inclination which this mirror might make with the photographic axis even in the most extreme cases will be very slight so that the depth of the reservoir 41 and the quantity of liquid contained therein will be small.

Although I have shown and described certain specific embodiments of my invention, I am fully aware that many modifications thereof are possible. My invention, therefore, is not to be limited to the precise details of construction shown and described but is intended to cover all modifications coming within the scope of the appended claims.

Having thus described my invention, what I claim is new and desire to secure by Letters Patent of the United States is:

1. In an astronomical camera for simultaneously photographing the true zenith and the surrounding field the combination of a primary optical system for imaging a field on a light sensitive surface, a secondary optical system for forming an image of a fiducial mark adapted to represent the zenith, means for optically combining said primary and secondary optical systems to cause the two images to fall simultaneously on the light sensitive surface in superposed relationship, and means for adjusting said fiducial mark in the secondary optical system until it indicates the true zenith, said last mentioned means including a level reflecting member insertable into the secondary optical system for indicating when said fiducial mark is adjusted to indicate the true zenith, and means for removing said level reflecting member from said optical system prior to making an exposure.

2. In an astronomical camera for simultaneously photographing the true zenith and the surrounding field the combination of a primary optical system for imaging a field on a light sensitive surface, a secondary optical system for forming an image of a fiducial mark adapted to represent the zenith, means for optically combining said primary and secondary optical systems to cause the two images to fall simultaneously on the light sensitive surface in superposed relationship, means for adjusting said fiducial mark in the second optical system, and a level reflecting member insertable into the combined optical systems for indicating when said fiducial mark is adjusted to indicate the true zenith and to appear at the center of the field on the light sensitive surface.

3. In an astronomical camera for simultaneously photographing the true zenith and the surrounding field the combination of a primary optical system for imaging a field on a light sensitive surface, a secondary optical system for forming an image of a fiducial mark adapted to represent the zenith, means for optically combining said primary and secondary optical systems to cause the two images to fall simultaneously on the light sensitive surface in superposed relationship, and means for adjusting said fiducial mark so that the image of the same on the light sensitive surface will appear as emanating from the true zenith, said last mentioned means including an eye-piece in the secondary optical system for illuminating and viewing said fiducial mark, and a level reflecting member movable into said secondary optical system for reflecting the image of said fiducial mark back into said eye-piece.

4. An astronomical camera according to claim 3, and in which the level reflecting member comprises a pivoted pool of mercury.

5. An astronomical camera according to claim 3, and in which the level reflecting member comprises a mirror floating on a pool of liquid, said pool of liquid being pivoted about a vertical axis for movement into and out of the secondary optical system.

6. In an astronomical camera for simultaneously photographing the true zenith and the surrounding field the combination of a primary optical system for imaging a field on a light sensitive surface, a secondary optical system for forming an image of a fiducial mark adapted to represent the true zenith, means for optically combining said primary and secondary optical systems to cause the two images to fall simultaneously on the light sensitive surface in superposed relationship, auto-collimating means for forming adjacent to the mark an image thereof which is in coincidence with the mark only when the image of the mark indicates the true zenith, means for observing the mark and its image, and means for adjusting the secondary optical system to bring the mark and its image into coincidence.

7. The combination according to claim 6 in which the auto-collimating means includes the secondary optical system and a level reflector movable into and out of said system.

DONALD L. WOOD.